United States Patent [19]

Narita et al.

[11] Patent Number: 5,148,532
[45] Date of Patent: Sep. 15, 1992

[54] PIPELINE PROCESSOR WITH PREFETCH CIRCUIT

[75] Inventors: Susumu Narita; Makoto Hanawa, both of Kokubunji; Tadahiko Nishimukai, Sagamihara; Tetsuhiko Okada, Fuchu, all of Japan

[73] Assignee: Hitachi, Ltd., Tokyo, Japan

[21] Appl. No.: 611,484

[22] Filed: Nov. 7, 1990

Related U.S. Application Data

[63] Continuation of Ser. No. 289,202, Dec. 23, 1988, abandoned.

[30] Foreign Application Priority Data

Dec. 25, 1987 [JP] Japan ................. 62-327142

[51] Int. Cl.⁵ ............ G06F 9/30; G06F 9/40; G06F 9/38
[52] U.S. Cl. .............. 395/375; 364/263.1; 364/261.7; 364/938.2
[58] Field of Search ............ 395/375; 364/DIG. 1, 364/DIG. 2 MS File

[56] References Cited

U.S. PATENT DOCUMENTS

| | | | |
|---|---|---|---|
| 4,003,033 | 1/1977 | O'Keefe et al. | 364/200 |
| 4,179,737 | 12/1979 | Kim | 364/200 |
| 4,187,539 | 2/1980 | Eaton | 364/200 |
| 4,399,507 | 8/1983 | Cosgrove et al. | 364/200 |
| 4,551,798 | 11/1985 | Horvath | 364/200 |
| 4,777,594 | 10/1988 | Jones et al. | 364/200 |

Primary Examiner—David Y. Eng
Attorney, Agent, or Firm—Fay, Sharpe, Beall, Fagan, Minnich & McKee

[57] ABSTRACT

In a pipeline processing microprocessor, an instruction fetch unit is keyed to the formation or nonformation of a conditional branch micro-instruction result to determine the subsequent macro-instruction to be fetched from an external memory or cache. A macro-instruction is first decoded in an instruction decoder to generate micro-addresses which address is a micro-ROM. The first micro-instruction retrieved from the micro-ROM contains information for executing a conditional discrimination, a signal requesting branch ready, and a subsequent micro-address for the actual execution of the branch request in accordance with the result of the conditional discrimination. When the branch condition is satisfied, a micro-address generating circuit feeds the subsequent micro-instruction to a micro-ROM address decoder and the least significant bit of the subsequent micro-address to a micro-address analyzing circuit. The branch ready information of the first micro-instruction is also fed to the micro-address analyzing circuit to prefetch a target branch macro-instruction from an associated memory before the micro-ROM outputs the micro-instruction, corresponding to the subsequent micro-address, to the instruction execution unit, in effect bypassing the delay associated with micro-ROM decoding.

10 Claims, 5 Drawing Sheets

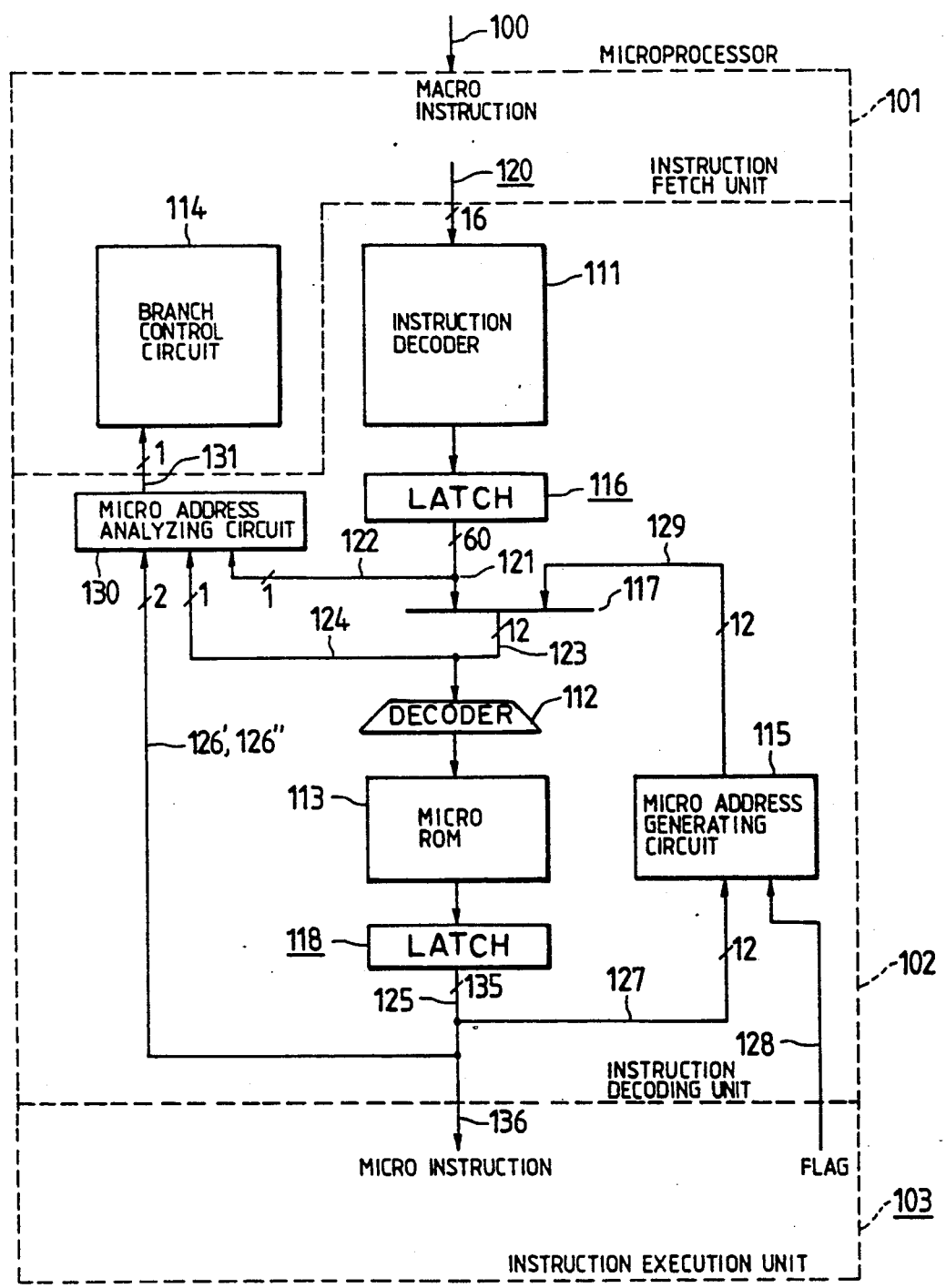

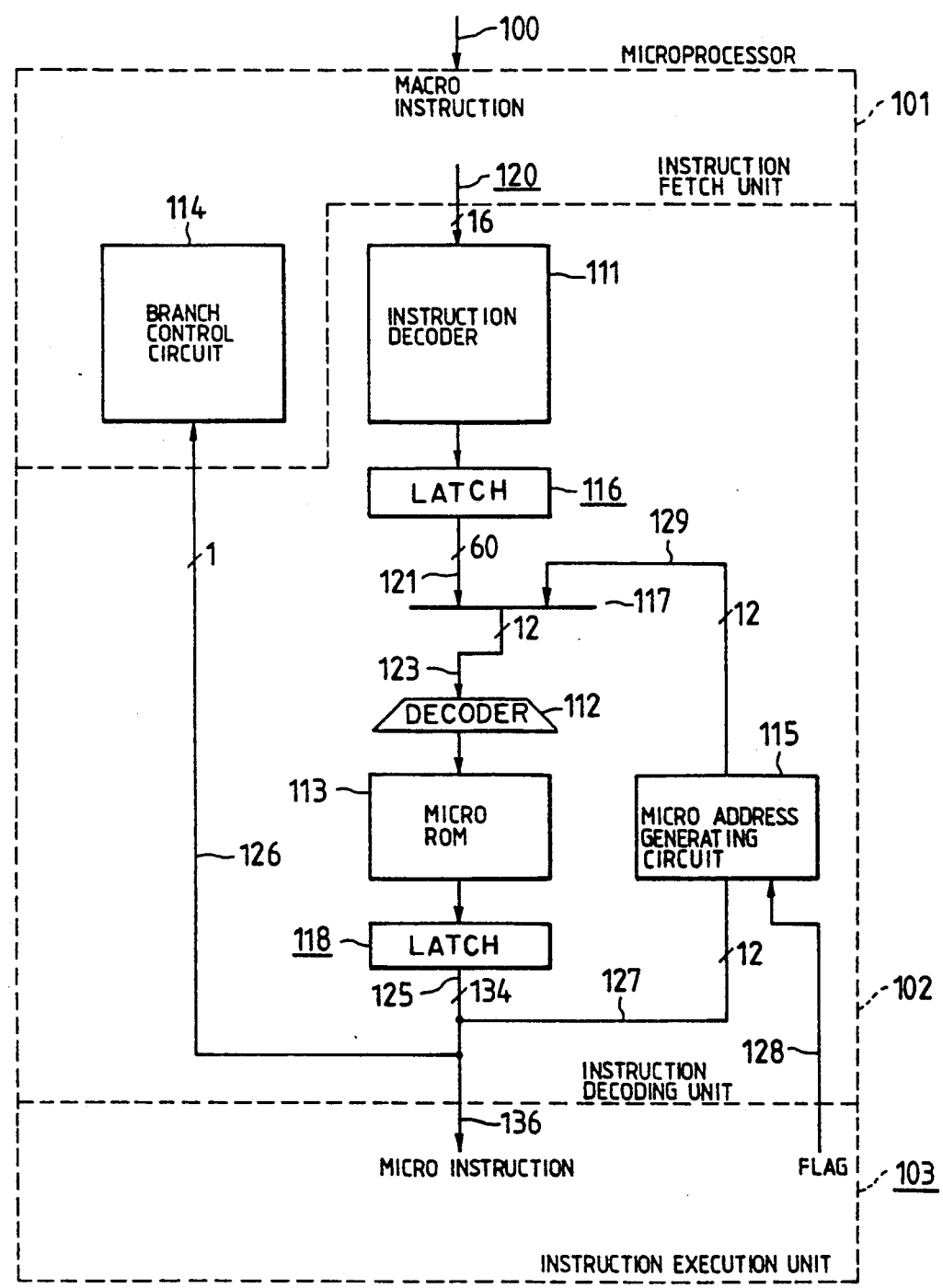

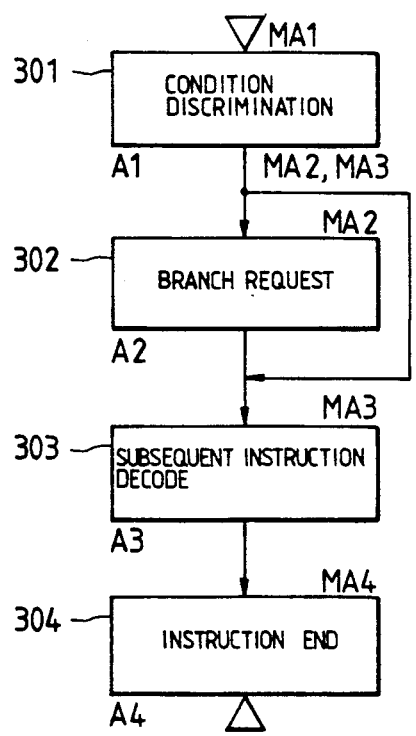
FIG. 3(A)
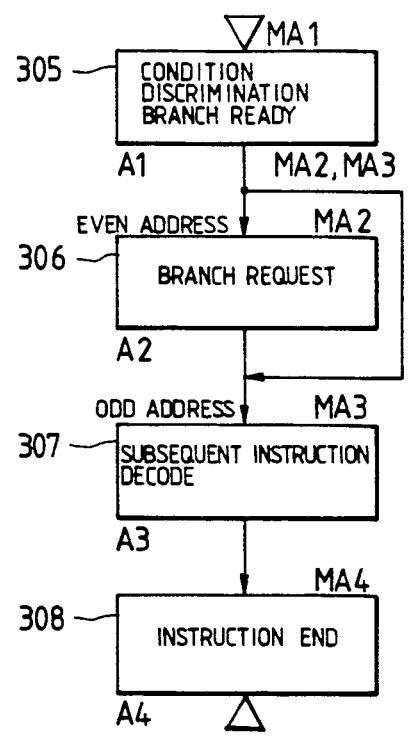
FIG. 3(B)
FIG. 4
| MICRO ADDRESS | MICRO ROM | |
| --- | --- | --- |
| | CONTENT | SUBSEQUENT MICRO ADDRESS |
| ⋮ | ⋮ | ⋮ |
| MA1 | CONDITION DISCRIMINATION INFORMATION BRANCH READY | MA2 |
| MA2 | BRANCH REQUEST | MA3 |
| MA3 | SUBSEQUENT INSTRUCTION DECODE | MA4 |
| MA4 | INSTRUCTION END | — |
| ⋮ | ⋮ | ⋮ |

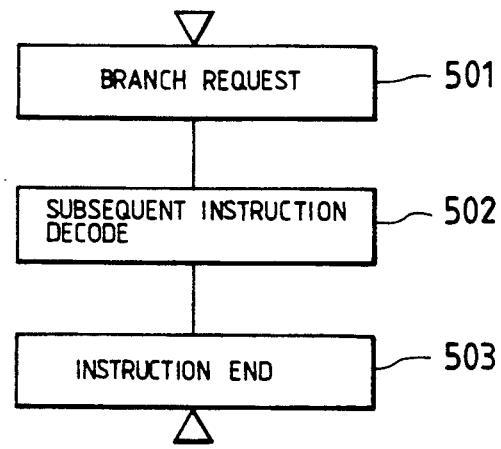
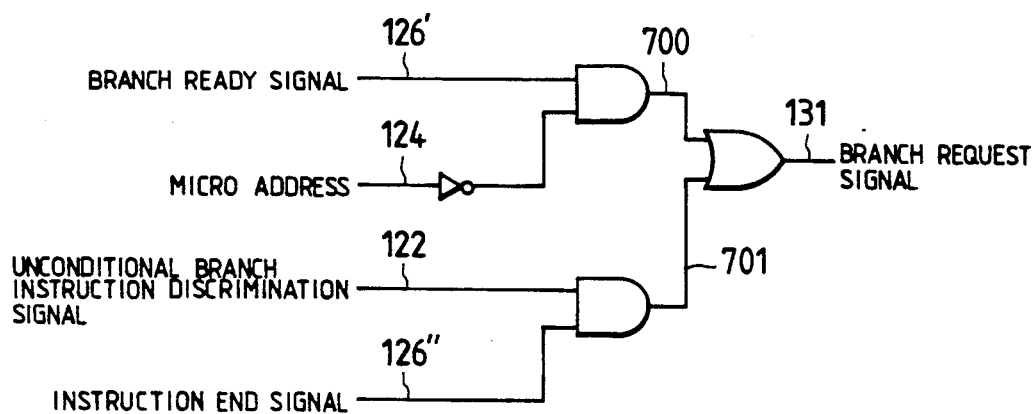

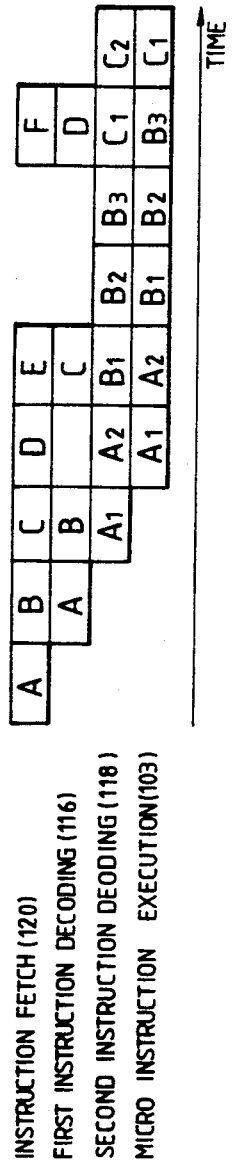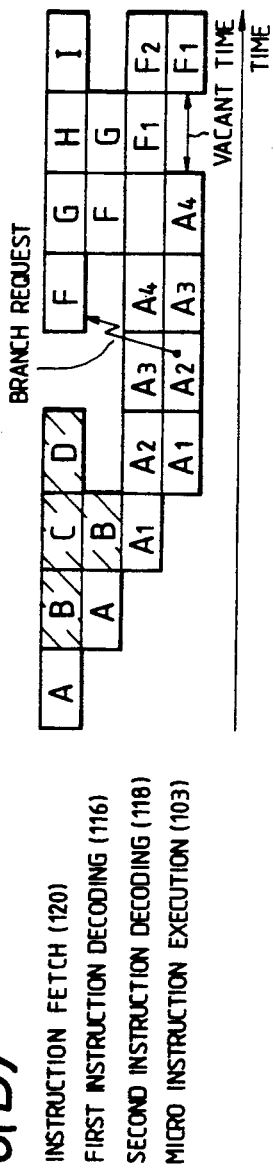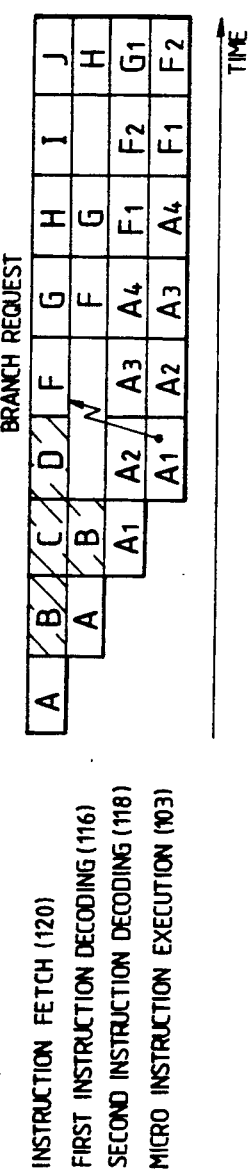

PIPELINE PROCESSOR WITH PREFETCH CIRCUIT

This is a continuation of copending application Ser. No. 7/289,202 filed on Dec. 23, 1988, now abandoned.

BACKGROUND OF THE INVENTION

1. Field of the Invention

The present invention relates to a micro-program control type data processing apparatus and, more particularly, to a microprocessor suitable for high speed processing.

2. Description of the Prior Art

The micro-program control type data processing apparatus of the prior art produces control signals in response to a micro-instruction fetched from a micro-program storing memory, as is disclosed on pp. 97 to 107 of Micro-Electronics 8 of Iwanami Series "VLSI Computer" edited by Tatsushi Motooka.

SUMMARY OF THE INVENTION

FIG. 2 shows an example of the structure of the microprocessor investigated by us on the basis of the prior art before the present application has been filed. In the microprocessor of this example, a pipe line processing stage is divided into four: an instruction fetch by an instruction fetch unit 101; a first instruction decoding (i.e., instruction decoder) by an instruction decoder 111 of an instruction decoding unit 102; a second instruction decoding (i.e., micro ROM) by a micro ROM 113 of the instruction decoding unit 102; and an instruction execution by an instruction execution unit 103. Since these four states are processed in parallel, the present microprocessor executes the so-called "pipeline processing". FIG. 6 shows the flow chart of the pipeline processing in the normal operation of the present microprocessor. The abscissa indicates the time, and the ordinate indicates each processing stage. The parenthesized numerals indicating the individual stages in FIG. 6(A) designate the signals at the inputs of the circuit, as designated at corresponding numerals in FIG. 2. Reference letters A to F in FIG. 6(A) designate individual macro-instructions. Each macro-instruction is fetched by the instruction fetch unit 101 from either the main memory outside of the microprocessor or the cache memory in the microprocessor and is decoded by the instruction decoder 111 to provide a micro-address 121. If the instruction A is decoded by the instruction decoder 111, for example, a micro-address MA1 is produced. This micro-address indicates the top address of a sub-routine A1 of the micro-program stored in the micro ROM 113. As a result, micro-addresses MA1, MA2, MA3 and MA4 correspond to a series of micro-program sub-routines A1, A2 and A3 constituting one macro-instruction A. As to each of the micro-addresses MA1 to MA4, moreover, the micro ROM 113 is searched so that the execution unit 103 is controlled on the basis of a micro-instruction 136. As seen from FIG. 6(A), the instruction execution is successively accomplished in the normal pipeline processing so that the micro-processor can process the instruction at a high speed.

On the contrary, FIG. 6(B) shows the flow chart of the processing in which the microprocessor executes a branch instruction to accomplish a branch processing. As apparently seen from FIG. 6(B), a vacant time is established in the instruction execution to drop the execution speed of the instruction. This is because a branch has occurred upon the execution of the instruction A.

The microprocessor pre-fetches the instruction, assuming that the instructions be executed sequentially in the order of A, B, C, D, . . . , and so on. If a branch takes place, however the instruction F is executed after the instruction A as in this example so that the pre-fetch of the instruction is useless. This processing disturbance appears as the vacant time of the execution unit.

In case, for example, the branch macro-instruction A is a conditional branch instruction, there arises the vacant time of the instruction execution, as described above. That is to say, the conditional branch instruction A is executed at the four steps: the micro-instruction A1, i.e., the step for executing a condition discrimination; the micro-instruction A2 for actually executing the branch in accordance with the result of the condition discrimination; the micro-instruction A3 for decoding a subsequent instruction in either case of the branch formation or non-formation; and the micro-instruction A4 for declaring the end of the branch macro-instruction A, and the pipeline processing is constructed of the four steps: the instruction fetch, the first instruction decoding, the second instruction decoding and the instruction execution, as described above.

In the microprocessor shown in FIG. 2, as has been described hereinbefore, the vacant time exists between the end of execution of the conditional branch instruction and the start of execution of the subsequent instruction.

On the other hand, the signal processing of the circuit such as the instruction fetch unit, the instruction decoding unit or the instruction execution unit of a single chip microprocessor having a semiconductor device (e.g., a MOSFET of 1.3 micronrule), which is formed on a semiconductor chip by using the fine semiconductor process, goes on increasing the speed.

As has been described hereinbefore, we have investigated and revealed the problem that the vacant time in the instruction execution in the aforementioned pipeline signal processing in the speed-up of the signal processing of the circuit in the microprocessor drops the overall performance of the microprocessor.

It is, therefore, an object of the present invention to provide a pipeline data processing apparatus in which the time interval between the executions of a conditional branch instruction and a subsequent instruction is shortened.

In order to achieve the above-specified object, according to one mode of the present invention, there is provided a data processing apparatus (100) comprising:

(1) an instruction fetch unit (101) for fetching an instruction stored in memory means;

(2) an instruction decoding unit (102) for decoding the instruction fetched by said instruction fetch unit (101); and (3) an instruction execution unit (103) adapted to be controlled by the output of said instruction decoding unit (102), wherein said instruction fetch unit (101) includes
  (1a) a branch control circuit (114) for fetching a branch target instruction stored in said memory means in response to a branch request signal from said instruction decoding unit, wherein said instruction decoding unit (102) includes:
  (2a) an instruction decoder (111) for generating a micro-address in response to the instruction fetched by said instruction fetch unit (101);
  (2b) a micro-program storing memory (113) responsive to the micro-address generated from said instruction decoder (111) for generating both a micro-instruction for controlling said instruction execution unit (103) and subsequent micro-address information relating to the micro-address of a subsequent micro-instruction to be executed after said micro-instruction; and (2c) a micro-address generating circuit (115) for generating a subsequent micro-address in response to at least both said subsequent micro-address information generated from said micro-program storing memory (113) and information (128) relating to the instruction execution result generated from said instruction execution unit (103), wherein the instruction decoder (111) of said instruction decoding unit (102) generates a first micro-address (MA1) for a conditional branch in response to a conditional branch instruction (A) fetched from said instruction fetch unit, wherein the micro-program storing memory (113) of said instruction decoding unit (102) responds to said first micro-address (MA1) for said conditional branch so as to output both information relating to the conditional discrimination for said conditional branch and information (126″) requesting a branch ready as a first micro-instruction and to output a second micro-address (MA2) subsequent to said first micro-address (MA1) as a subsequent micro-address, wherein the micro-program storing memory (113) of said instruction decoding unit (102) responds to said second micro-address (MA2) so as to output both information requesting the branch as a second micro-instruction (A2) and a third micro-address (MA3) subsequent to said second micro-address (MA2) as a subsequent micro-address, wherein the micro-program storing memory (113) of said instruction decoding unit (102) responds to said third micro-address (MA3) to output an information requesting a subsequent instruction decoding as a third micro-instruction (M3), wherein said micro-address generating circuit (115) responds to both the information relating to said conditional discrimination in said first microinstruction (A1) and the information (128) relating to the instruction execution result generated from said instruction execution unit for determining whether the condition for said conditional branch is satisfied, so as to generate said second micro-address (MA2) as a subsequent micro-address in response to satisfaction and said third micro-address (MA3) as a subsequent micro-address in response to non-satisfaction, and wherein said instruction decoding unit (102) further includes a signal analyzing circuit (130) responsive to both said branch ready request information (126′) and said second micro-address (MA2) generated as a subsequent micro-address from said micro-address generating circuit (115) when said condition is satisfied, for generating said branch request signal (131) to be fed to the branch control circuit (114) of said instruction fetch unit (101).

In the microprocessor of FIG. 2 investigated before the application of the present invention, there is not arranged the signal analyzing circuit (130). In addition, the first micro-instruction (A1), which is outputted from the micro-program storing memory (113) of the instruction decoding unit (102), contains only the information relating to the conditional discrimination for the conditional branch but not any information requesting the branch ready.

As a result, in the microprocessor of FIG. 2, the microprogram storing memory (113) outputs both the information relating to the conditional discrimination for the conditional branch as the first micro-instruction (A1) and the second micro-address (MA2) as the subsequent micro-address in response to the first micro-address (MA1). When the branch condition of the conditional branch instruction is satisfied, the micro-address generating circuit (115) generates the second micro-address (MA2) as the subsequent micro-address. In response to this second micro-address (MA2), the micro-program storing memory (113) outputs the information (126) requesting the branch as the second micro-instruction (A2). At this time, the actual branch is executed by the conditional branch instruction.

As the scale of the instruction signal processing of the data processing apparatus such as the micro-processor enlarged, the scale of the micro-program storing memory (113) is accordingly enlarged. As a result, in accordance with the increase in the scales, the instant, at which the micro-program storing memory (113) outputs the information (126) requesting the branch as the second micro-instruction (A2) in response to the second micro-address (MA2), is necessarily delayed. As a result, in the microprocessor of FIG. 2, the fetch time of the branch target instruction is also delayed to establish an appreciable vacant time between the execution of the conditional branch instruction and the execution of the subsequent instruction as the branch target instruction.

In the microprocessor according to one mode of the present invention, the first micro-instruction (A1), which is outputted from the micro-program storing memory (113) of said instruction decoding unit (102) in response to the first micro-address (MA1), contains both the information relating to the conditional discrimination for the conditional branch and the information (126′) requesting the branch ready. There is arranged the signal analyzing circuit (130) which generates the branch request signal (131) to be fed to the branch control circuit (114) of the instruction fetch unit (101), in response to both the branch ready request information (126′) and the second micro-address (MA2) which is generated as the subsequent micro-address from the micro-address generating circuit (115) when the branch condition of the conditional branch instruction is formed.

Thus, in the microprocessor according to one mode of the present invention, in response to the first micro-address (MA1), the micro-program storing memory (113) outputs the information relating the conditional discrimination for the conditional branch as the first micro-instruction (A1) and the second micro-address (MA2) as the subsequent micro-address. When the branch condition of the conditional branch instruction is formed, the micro-address generating circuit (115) generates the second micro-address (MA2) as the subsequent micro-address. At this time, the actual branch according to the conditional branch instruction is requested by the branch request signal (131) of the signal analyzing circuit (130) so that the subsequent instruction as the branch target instruction can be early fetched. This makes it possible to shorten the vacant time between the execution of the conditional branch instruction and the execution of the subsequent instruction as the branch target instruction.

The other objects and other novel features of the present invention will become apparent from the following detailed description to be made in connection with the embodiment thereof with reference to the accompanying drawings.

BRIEF DESCRIPTION OF THE DRAWINGS

FIG. 1 is a block diagram showing a microprocessor according to one embodiment of the present invention; invented FIG. 2 is a block diagram showing the micro-processor as an intermediate solution to the condition processing delay time problem;

FIG. 3(A) is a processing flow chart of the conditional branch instruction of the microprocessor of FIG. 2;

FIG. 3(B) is a processing flow chart of the conditional branch instruction of the microprocessor of FIG. 1;

FIG. 4 is a diagram showing the structure of the micro-ROM 113 in the microprocessor of FIG. 1;

FIG. 5 is a processing flow chart of the unconditional branch instruction of the microprocessor of FIG. 1;

FIG. 6(A) is a flow chart showing the pipeline processing in the normal operation of the micro-processor of FIG. 2;

FIG. 6(B) is a flow chart showing the pipeline processing relating to the conditional branch instruction of the microprocessor of FIG. 2;

FIG. 6(C) is a flow chart showing the pipeline processing relating to the conditional branch instruction of the microprocessor of FIG. 1; and FIG. 7 is a circuit diagram showing one example of the micro-address analyzing circuit in the micro-processor of FIG. 1.

DESCRIPTION OF THE PREFERRED EMBODIMENTS

FIG. 1 shows an example of the structure of the microprocessor according to the present invention.

A microprocessor 100 is composed mainly of an instruction fetch unit 101, an instruction decoding unit 102 and an instruction execution unit 103. The instruction fetch unit 101 fetches a macro-instruction from a main memory outside of the microprocessor or a cache memory inside of the microprocessor. The macro-instruction thus fetched is sent to the instruction decoding unit 102, in which it is decoded at two stages of an instruction decoder 111 and a micro-ROM 113. In accordance with the micro-instruction, i.e., the decoded result, the instruction execution unit 103 executes the instruction.

The instruction decoder 111 decodes the macro-instruction coming from the instruction fetch unit 101 and outputs the decoded result of 60 bits containing a micro-address to a latch circuit 116. The micro-address, i.e., the decoded result outputted from the latch circuit 116 is inputted through a selector 117 and an address decoder 112 to the micro-ROM 113 so that a micro-instruction 125 of 135 bits is obtained as an ROM access. The micro-instruction 125 contains not only an information 136 for controlling the execution unit 103 but also a subsequent micro-address information 127 of 12 bits. This subsequent micro-address 127 is inputted again through a micro-address generating circuit 115 and the selector 117 to the micro-ROM 113 so that a subsequent micro-instruction is fetched.

Incidentally, the instruction decoder 111 outputs the top micro-address of a sub-program composed of the micro-instruction.

In FIG. 6(A), for example, if an instruction A is decoded, the top micro-address A1 of the sub-program is outputted.

In response to the top micro-address generated by the instruction decoder 111, the micro-program storing memory (i.e., micro-ROM) 113 generates both a micro-instruction for controlling the instruction execution unit 103, the micro-address generating circuit 115 and a branch control circuit 114 and a subsequent micro-address information relating to the micro-address of a subsequent micro-instruction to be executed after the micro-instruction. In response to the subsequent micro-address generated from the output of the micro-address generating circuit 115 and fed through the selector 117, moreover, the micro-ROM 113 outputs a succeeding subsequent micro-instruction and a succeeding subsequent micro-address information.

FIG. 4 shows the content of the micro-ROM 113. The lefthand of FIG. 4 shows the micro-address to be fed to the micro-ROM 113; the center of FIG. 4 shows the content of the micro-instruction to be generated from the micro-ROM 113 in response to each micro-address; and the righthand of FIG. 4 shows the subsequent micro-address to be generated from the micro-ROM 113 in response to each micro-address.

In FIG. 4, micro-addresses MA1, MA2, MA3 and MA4 constitute a conditional branch micro-instruction A. If the conditional branch macro-instruction A is fed to the instruction decoding unit 102 through the instruction fetch unit 101 from the main memory outside of the microprocessor or the cache memory inside of the microprocessor, the instruction decoder 111 generates the top micro-address MA1 for the conditional branch.

In response to the top micro-address MA1, the micro-ROM 113 outputs not only both the information relating to the conditional discrimination for the conditional branch and the information 126' requesting the branch ready as the first micro-instruction but also the second micro-address MA2 subsequent to the first micro-address MA1 as a subsequent micro-address.

Incidentally, this branch ready request information indicated by a signal 126' of 1 bit is fed from the output of the micro-ROM 113 through the latch circuit 118 to a later-described micro-address analyzing circuit 130.

If this second micro-address MA2 is fed through the selector 117 to the input of the micro-ROM 113, this micro-ROM 113 outputs the information requesting the branch as the second micro-instruction A2 and the third micro-address MA3 subsequent to the second micro-address MA2 as a subsequent micro-address.

Incidentally, in the present embodiment, the second micro-address MA2 is disposed at an even address, and the third micro-address MA3 is disposed at an odd address.

When this third micro-address MA3 is fed through the selector 117 to the input of the micro-ROM 113, this micro-ROM 113 outputs the information requesting a subsequent instruction decoding as the third micro-instruction A3 and the fourth micro-address MA3 subsequent to the third micro-address MA4 as a subsequent micro-address.

If this fourth micro-address MA4 is fed through the selector 117 to the input of the micro-ROM 113, this micro-ROM 113 outputs the information declaring the end of the branch instruction as the fourth microinstruction A4. At this declaration of the end of the branch instruction, however, any subsequent micro-address is outputted.

If the conditional branch macro-instruction A is fed from the main memory outside of the micro-processor 100 or the cache memory inside of the same through the instruction fetch unit 101 to the instruction decoding unit 102, the instruction decoder 111 generates the top micro-address MA1 for the conditional branch. In response to this top micro-address MA1, the micro-ROM 113 outputs not only both the information relating to the conditional discrimination for the conditional branch and the information 126' requesting the branch ready as the first micro-instruction A1 but also the second micro-address MA2 subsequent to the first micro-address MA1 as a subsequent micro-address.

In response to both the information relating to the conditional discrimination in the first micro-instruction A1 and a flag information 128 relating to the execution result of the preceding instruction generated by the instruction execution unit 103, on the other hand, the micro-address generating circuit 115 discriminates the formation or non-formation of the condition for the conditional branch. When the condition is formed, the micro-address generating circuit 115 generates the second micro-address MA2 as a subsequent micro-address. When the condition is not formed, on the contrary, the micro-address generating circuit 115 generates the third micro-address MA3 as a subsequent micro-address.

In other words, what constitutes the base of the conditional discrimination of the conditional branch instruction is the flag information 128 which is left in the instruction execution 103 by the instruction executed already.

In the present embodiment, as shown in FIG. 1, there is disposed in the instruction decoding unit 102 the signal analyzing circuit 130 for generating a branch requesting signal 131 to be fed to the branch control circuit 114 of the instruction fetch unit 101, in response to both the branch ready request information 126' and the second micro-address MA2 at an even address, which is generated as a subsequent micro-address from the micro-address generating circuit 115 when the branch condition of the conditional branch instruction is formed.

More specifically, when the branch condition of the conditional branch instruction is formed, the even address is generated as a subsequent micro-address from the micro-address generating circuit 115. When the branch condition of the conditional branch instruction is not formed, on the contrary, the odd address is generated as a subsequent micro-address from the micro-address generating circuit 115. As a result, the formation or non-formation of the branch condition of the conditional branch instruction can be discriminated by monitoring the LSB (i.e., Least Significant Bit) signal of 1 bit of the address signal generated from the micro-address generating circuit 115. In other words, this LSB signal is a signal 124 of 1 bit which is fed from the output of the micro-address generating circuit 115 through the selector 117 to the micro-address analyzing circuit 130. If this LSB signal 124 is at the "0" level, the branch condition of the conditional branch instruction is formed so that the even address is generated as the subsequent micro-address from the micro-address generating circuit 115. If the LSB signal 124 is at the "1" level, the branch condition of the conditional branch instruction is not formed so that the odd address is generated as the subsequent micro-address from the micro-address generating circuit 115.

As a result, the micro-address analyzing circuit 130 outputs the branch request signal 131 in response to the LSB signal 124 at the "0" level and the branch ready request information 126'.

On the other hand, not only the conditional branch instruction but also the speed-up of the signal processing of the unconditional branch instruction is one of the important technical subjects. In order to achieve this technical subject, the following devices are added to the present embodiment shown in FIG. 1.

If the unconditional branch macro-instruction is fed to the instruction decoding unit 102 through the instruction fetch unit 101 from the main memory outside of the microprocessor 100 or the cache memory inside of the same, the instruction decoder 111 responds to that unconditional branch macro-instruction and output an unconditional branch instruction discrimination signal 122. This unconditional branch instruction discrimination signal 122 is fed through the latch circuit 116 to the micro-address analyzing circuit 130. If the last instruction end micro-instruction 126" relating to the macro-instruction fetched from the outside main memory or the inside cache memory before the unconditional branch instruction is generated through the latch circuit 118 from the output of the micro-ROM 113, the micro-address analyzing circuit 130 outputs the branch request signal 131 in response to the instruction end micro-instruction 126" and the unconditional branch instruction discrimination signal 122 so that the instruction fetch unit 101 starts an early fetch of a subsequent instruction of the branch target.

FIG. 7 shows one example of the structure of the micro-address analyzing circuit 130. In case the branch condition of the conditional branch instruction is formed, the output 700 of one AND circuit is asserted. In case the unconditional branch instruction is fetched and decoded, the output 701 of the other AND circuit is asserted. In either case, the branch request signal 131 is generated from the output of the OR circuit.

The signal processing operations of the micro-processor of the present embodiment shown in FIG. 1 will be described in detail in the following with reference to FIGS. 3 and 6.

FIG. 3(A) shows the signal processing operations relating to the conditional branch instruction of the microprocessor investigated before the application of the present invention, as shown in FIG. 2. As has been described hereinbefore, if the conditional branch macro-instruction A is fed to the instruction decoding unit 102 from the main memory outside of the microprocessor or the cachememory inside of the same, the instruction decoder 111 generates the top micro-address MA1 for the conditional branch.

In response to this top micro-address MA1, at Step 301 of FIG. 3(A), the micro-ROM 113 outputs the information relating to the conditional discrimination for the conditional branch as the first micro-instruction and the second micro-address MA2 subsequent to that micro-address MA1 as the subsequent micro-address.

At this step 301, the micro-address generating circuit 115 outputs the second micro-address MA2 as the subsequent micro-address if the branch condition of the conditional branch instruction is formed. The branch is not requested before the output stage of Step 302 of FIG. 3(A), at which the micro-ROM 113 outputs a branch request information 126 in response to that second micro-address MA2. As a result, a vacant time exists between the execution of the conditional branch instruction and the execution of the subsequent instruction, as shown in FIG. 6(B). If the branch condition of the conditional branch instruction is not formed, on the contrary, the micro-address generating circuit 115 outputs the third micro-address MA3 as the subsequent micro-address at that step 301. In response to this third micro-address MA3, at Step 303 of FIG. 3(A), the micro-ROM outputs both the information requesting the subsequent instruction decoding as the third micro-instruction A3 and the fourth micro-address MA4. In response to this fourth micro-address MA4, at Step 304 of FIG. 3(A), the micro-ROM 113 outputs the information declaring the end of the branch instruction as the fourth micro-instruction A4.

On the other hand, the signal processing operations of the microprocessor of the present embodiment shown in FIG. 1 can process the conditional branch instruction at a high speed, as will be described in the following.

If the conditional branch macro-instruction A is fed to the instruction decoding unit 102 from the main memory outside of the microprocessor or inside cache of the same, as described hereinbefore, the instruction decoder 111 generates the top micro-address MA1 for the conditional branch.

In response to the top micro-address MA1, at Step 305 of FIG. 3(B), the micro-ROM 113 outputs not only both the information relating to the conditional discrimination for the conditional branch and the information 126' requesting the branch ready as the first micro-instruction but also the second micro-address MA2 of an even address subsequent to that micro-address MA1 as the subsequent micro-address.

If the branch condition of the conditional branch instruction is formed, at Step 305, the micro-address generating circuit 115 outputs the second micro-address MA2 as the subsequent micro-address. The branch is requested already at the input stage of Step 306 of FIG. 3(B), at which the micro-address analyzing circuit 130 outputs the branch request information 126' as the second micro-instruction A2 in response to the branch ready request information 126' and the second micro-address MA2 at the even address. As a result, no vacant time exists between the execution of the conditional branch instruction and the execution of the subsequent instruction, as shown in FIG. 6(C). If the branch condition of the conditional branch instruction is not formed at that Step 305, on the contrary, the micro-address generating circuit 115 outputs the third micro-address MA3 of the odd address as the subsequent micro-address. In response to the third micro-address MA3 of the odd address, at Step 307 of FIG. 3(B), the micro-ROM 113 outputs both the information requesting the subsequent instruction decoding as the third micro-instruction A3 and the fourth micro-address MA4. In response to this fourth micro-address MA4, at Step 308 of FIG. 3(B), the micro-ROM 113 outputs the information declaring the end of the branch instruction as the fourth micro-instruction A4.

FIG. 5 shows a signal processing flow chart for processing the unconditional branch instruction. In response to the top first micro-address for the unconditional branch, at Step 501, the information requesting the unconditional branch is outputted as the first micro-instruction, and the second micro-address subsequent to that top first micro-address is outputted as the subsequent micro-address. In response to this second micro-address, at Step 502, the information requesting the subsequent instruction decode is outputted as the second micro-instruction, and the third micro-address is outputted. In response to this third micro-address, at Step 503, the information declaring the end of the branch instruction is outputted as the third micro-instruction.

Incidentally, the Step 501 of FIG. 5 is executed at the two stages of the first instruction decoding of the instruction decoder 111 of the instruction decoding unit 102 and the second instruction decoding of the micro-ROM 113. In the present embodiment of FIG. 1, the unconditional branch decoding signal 122 obtained from the result of the first instruction decoding of the Step 501 is fed to the micro-address analyzing circuit 130 so that the high-speed branch request is accomplished in response to the branch request signal of the micro-address analyzing circuit 130.

Although the present invention has been described hereinbefore in detail in connection with the embodiment thereof, it should not be limited to the foregoing embodiment but can adopt a variety of modified modes.

For example, the branch request information as the second micro-instruction A2 of FIG. 4 needs not actively request the branch any more, it may have a content requesting the branch passively. For another example, the information content of the passive branch request can be constructed of the information content by which the branch ready of the first micro-instruction A1 is not cancelled. The information content of this passive branch request also corresponds to the information requesting the branch by the technical concept of the present invention.

According to the present invention, the content of the subsequent instruction to be fetched is different in dependence upon the formation or non-formation of the branch condition of the conditional branch instruction, but the branch request is made at an early stage in response to the subsequent micro-address information of a specific address, which is generated from the micro-address circuit when the branch condition is formed, so that the time interval between the execution of the conditional branch instruction and the execution of the subsequent instruction can be shortened.

What is claimed is:

1. A data processing apparatus comprising:
    (1) an instruction fetch unit for fetching an instruction stored in a memory means;
    (2) an instruction decoding unit for decoding the instruction fetched by said instruction fetch unit; and
    (3) an instruction execution unit controlled by said instruction decoding unit,
    wherein said instruction fetch unit includes
        (1a) a branch control circuit for fetching a branch target instruction stored in said memory means in response to a branch request signal from said instruction decoding unit,
    wherein said instruction decoding unit includes:
        (2b) an instruction decoder for generating micro-addresses in response to the instruction fetched by said instruction fetch unit;
        (2b) a micro-program storing memory responsive to the micro-address generated by said instruction decoder for generating both a micro-instruction for controlling said instruction execution unit and subsequent micro-address information relating to the micro-address of a subsequent micro-instruction to be executed after said micro-instruction; and (2c) a micro-address generating circuit for generating a subsequent micro-address in response to at least both the subsequent micro-address information generated from said micro-program storing memory and information relating to the instruction execution result generated from said instruction execution unit, wherein the instruction decoder of said instruction decoding unit generates a first of an ordered set of micro-addresses for a conditional branch in response to a conditional branch instruction fetched from said instruction fetch unit, wherein the micro-program storing memory of said instruction decoding unit responds to said first of the ordered set of micro-addresses for said conditional branch an outputs both information relating to the conditional branch and information first memory further micro-addresses as a to the first wherein the instruction decoding unit address and outputs information a second micro-instruction, and the storing memory further outputs a third a subsequent micro-address subsequent micro-address, wherein the micro-program storing memory instruction decoding unit responds to said address and outputs information requesting a instruction decoding as a third micro-instruction, wherein said micro-address generating circuit determines whether the condition of the conditional branch is satisfied based on both the information relating to said conditional discrimination in said first micro-instruction and the information relating to the instruction execution result generated from said instruction execution unit and generates said second micro-address as a subsequent micro-address in response to determining satisfaction of the conditional branch condition, and said micro-address generating circuit further generates said third micro-address as a subsequent micro-address in response to nonsatisfaction of the condition, and wherein said instruction decoding unit further includes:

(2d) a signal analyzing circuit for generating said branch request signal to control the branch control circuit of said instruction fetch unit when said branch ready request information was generated from said micro-program storing memory and when said second micro-address was generated from said micro-address generating circuit in response to determining satisfaction of said conditional branch condition.

2. The data processing apparatus according to claim 1, wherein said signal analyzing circuit generates said branch request signal in response to a least significant bit signal of said second micro-address.

3. A microprocessor comprising:

(1) an instruction fetch unit for fetching an instruction stored in a memory means;

(2) an instruction decoding unit for decoding the instruction fetched by said instruction fetch unit; and (3) an instruction execution unit controlled by said instruction decoding unit, wherein said instruction fetch unit includes (1a) a branch control circuit for fetching a branch target instruction stored in said memory means in response to a branch request signal from said instruction decoding unit, wherein said instruction decoding unit includes:

(2a) an instruction decoder for generating micro-addresses in response to the instruction fetched by said instruction fetch unit;

(2b) a micro-program storing memory responsive to the micro-address generated by said instruction decoder for generating both a micro-instruction for controlling said instruction execution unit and subsequent micro-address information relating to the micro-address of a subsequent micro-instruction to be executed after said micro-instruction; and (2c) a micro-address generating circuit for generating a subsequent micro-address in response to at least both said subsequent micro-address information generated from said micro-program storing memory and information relating to the instruction execution result generated from said instruction execution unit, wherein the instruction decoder of said instruction decoding unit generates a first of the micro-addresses for a conditional branch in response to a conditional branch instruction fetched from said instruction fetch unit, wherein the micro-program storing memory of said instruction decoding unit responds to said first micro-address for said conditional branch and outputs both information relating to the conditional discrimination for said conditional branch and information requesting a branch ready as a first micro-instruction, and the micro-program storing memory further outputs a second of the micro-addresses, wherein the micro-program storing memory of said instruction decoding unit responds to said second micro-address and outputs a third micro-address as a subsequent micro-address subsequent to said second micro-address, wherein the micro-program storing memory of said instruction decoding unit responds to said third micro-address and outputs information requesting a subsequent instruction decoding as a third micro-instruction, wherein said micro-address generating circuit determines whether the condition of the conditional branch is satisfied based on both the information relating to said conditional discrimination in said first micro-instruction and the information relating to the instruction execution result generated from said instruction execution unit and generates said second micro-address as a subsequent micro-address in response to determining satisfaction of the conditional branch condition, and said micro-address generating circuit further generates said third micro-address as a subsequent micro-address in response to nonsatisfaction of the condition, and wherein said instruction decoding unit further includes:

(2d) a signal analyzing circuit for generating said branch request signal to b fed to the branch control circuit of said instruction fetch unit when said branch ready request information was generated from said micro-program storing memory and when said second micro-address was generated from said micro-address generating circuit in response to determining satisfaction of said conditional branch condition.

4. The microprocessor according to claim 3, wherein said signal analyzing circuit generates said branch request signal in response to a least significant bit signal of said second micro-address.

5. A micro-address analyzing circuit for use with a microprocessor having an instruction decoding unit comprising a micro-address generating circuit for generating a subsequent micro-address, an instruction fetch unit, responsive to a branch request signal, for fetching a conditional branch macro-instruction from an associated memory and for serving the fetched conditional branch macro-instruction to the instruction decoding unit, and an instruction execution unit for executing a conditional branch micro-instruction, the micro-address analyzing circuit comprising:
- a least significant bit signal line for inputting into the micro-address analyzing circuit a first signal comprising least significant bit information of the subsequent micro-address generated by the micro-address generating circuit, the micro-address generating circuit generating an even addressed subsequent micro-address when the conditional branch micro-instruction executed in the instruction execution unit is satisfied and generating an odd addressed subsequent micro-address when the conditional branch micro-instruction executed in the instruction execution unit is not satisfied;
- a branch ready request line for inputting into the micro-address analyzing circuit a second signal comprising branch ready request information generated by the instruction decoding unit when the conditional branch macro-instruction is served by the instruction fetch unit; and
- logic means, responsive to the first and second signals, for generating said branch request signal when: i) the subsequent micro-address is even addressed; and, ii) the conditional branch macro-instruction is served by the instruction fetch unit.

6. The micro-address analyzing circuit of claim 5 in combination with a microprocessor comprising: an instruction decoding unit having a micro-address generating circuit for generating subsequent micro-addresses; an instruction fetch unit, responsive to a branch request signal, for fetching macro-instructions from an associated memory and for serving the fetched macro-instructions to the instruction decoding unit; and, an instruction execution unit for executing a conditional branch instruction.

7. A micro-address analyzing circuit for use with a microprocessor having an instruction decoding unit comprising a micro-address generating circuit for generating a subsequent micro-address, an instruction fetch unit, responsive to a branch request signal, for fetching an unconditional branch macro-instruction from an associated memory and for serving the fetched unconditional branch macro-instruction to the instruction decoding unit, and an instruction execution unit for executing an unconditional branch micro-instruction, the circuit comprising:
- an unconditional branch macro-address signal line for inputting into the micro-address analyzing circuit a first signal comprising unconditional branch macro-instruction discrimination information generated by an instruction decoder within the instruction decoding unit when the unconditional branch macro-instruction is served to the instruction decoding unit by the instruction fetch unit;
- a micro-instruction end signal line for inputting into the micro-address analyzing circuit a second signal comprising instruction micro-instruction end information generated by the instruction decoding unit when an end micro-instruction is served to the instruction execution unit; and
- logic means, responsive to the first and second signals, for generating said branch request signal when: i) the unconditional branch macro-instruction is served to the instruction decoding unit; and, ii) the end micro-instruction is served to the instruction execution unit.

8. The micro-address analyzing circuit of claim 7 in combination with a microprocessor comprising: an instruction decoding unit having a micro-address generating circuit for generating a subsequent micro-address; an instruction fetch unit, responsive to a branch request signal, for fetching an unconditional branch macro-instruction from an associated memory and for serving the fetched unconditional branch macro-instruction to the instruction decoding unit; and, an instruction execution unit for executing an unconditional branch micro-instruction.

9. A micro-address analyzing circuit for use with a microprocessor having i) an instruction decoding unit comprising a micro-address generating circuit for receiving a macro-instruction and for generating a first micro-address and a subsequent micro-address, ii) an instruction fetch unit, responsive to a branch request signal, for fetching the macro-instruction from an associated memory and for serving the fetched macro-instruction to the instruction decoding unit, and iii) an instruction execution unit for executing the first micro-instruction, the micro-address analyzing circuit comprising:
- a least significant bit signal line for inputting into the micro-address analyzing circuit a first signal comprising least significant bit information of the subsequent micro-address generated by the micro-address generating circuit, the micro-address generating circuit generating an even addressed subsequent micro-address when a condition of a conditional branch micro-instruction executed as the first micro-instruction in the instruction execution unit is satisfied, and generating an odd addressed subsequent micro-address when the condition of the conditional branch micro-instruction executed as the first micro-instruction in the instruction execution unit is not satisfied;
- a branch ready request line for inputting into the micro-address analyzing circuit a second signal comprising branch ready request information generated by the instruction decoding unit when a conditional branch macro-instruction is served to the instruction decoding unit by the instruction fetch unit;
- an unconditional branch macro-address signal line for inputting into the micro-address analyzing circuit a third signal comprising unconditional branch macro-instruction discrimination information generated by an instruction decoder within the instruction decoding unit when an unconditional branch macro-instruction is served to the instruction decoding unit by the instruction fetch unit;

a micro-instruction end signal line for inputting into the micro-address analyzing circuit a fourth signal comprising micro-instruction end information generated by the instruction decoding unit when an end micro-instruction is served to the instruction execution unit;

first logic means, responsive to the first and second signals, for generating a first combined signal when: i) the subsequent micro-address is even addressed; and, ii) the conditional branch macro-instruction is served to the instruction decoding unit by the instruction fetch unit;

second logic means, responsive to the second and third signals, for generating a second combined signal when: i) an unconditional branch macro-instruction is served to the instruction decoding unit by the instruction fetch unit; and, ii) an end micro-instruction is served to the instruction execution unit; and, third logic means, responsive to the first combined signal and the second combined signal, for generating said branch request signal when both the first combined signal and the second combined signal are generated.

10. The micro-address analyzing circuit of claim 9 in combination with a microprocessor having i) an instruction decoding unit comprising a micro-address generating circuit for receiving a macro-instruction and for generating a first micro-address and a subsequent micro-address, ii) an instruction fetch unit, responsive to a branch request signal, for fetching the macro-instruction from an associated memory and for serving the fetched macro-instruction to the instruction decoding unit, and iii) an instruction execution unit for executing the first micro-instruction.

* * * * *

UNITED STATES PATENT AND TRADEMARK OFFICE
CERTIFICATE OF CORRECTION

PATENT NO. : 5,148,532
DATED : September 15, 1992
INVENTOR(S) : Susumu Narita, et al.

It is certified that error appears in the above-identified patent and that said Letters Patent is hereby corrected as shown below:

Claim 1, column 10, line 60, delete "(2b)" and replace with --(2a)--.

Claim 1, column 11, line 18, delete "an" and replace with --and--.

Claim 1, column 11, line 19, after "relating to the" delete everything through line 29 and replace with the following:
--conditional discrimination for said conditional branch and information requesting a branch ready as a first micro-instruction, and the micro-program storing memory further outputs a second of the ordered set of micro-addresses as a subsequent micro-address subsequent to the first micro-address,
   wherein the micro-program storing memory of said instruction decoding unit responds to said second micro-address and outputs information requesting the branch as a second micro-instruction, and the micro-program storing memory further outputs a third micro-address as a subsequent micro-address subsequent to said second micro-address,
   wherein the micro-program storing memory of said instruction decoding unit responds to said third micro-address and outputs information requesting a subsequent instruction--.

Claim 3, column 12, line 66, delete "b" and replace with --be--.

. Signed and Sealed this

Seventh Day of September, 1993

Attest:

BRUCE LEHMAN

*Attesting Officer*          *Commissioner of Patents and Trademarks*